United States Patent
Benedict et al.

(10) Patent No.: US 10,585,419 B1
(45) Date of Patent: Mar. 10, 2020

(54) METHODS AND DEVICES FOR PERFORMING IN-SITU INSPECTIONS DURING A COMPUTER ASSISTED SETUP OF A MACHINE TOOL TABLE

(71) Applicant: Beneficial Machine Tools LLC, Fremont, CA (US)

(72) Inventors: George Benedict, Fremont, CA (US); Gary Schmitt, Scotts Valley, CA (US)

(73) Assignee: BENEFICIAL MACHINE TOOLS LLC, Fremont, CA (US)

(*) Notice: Subject to any disclaimer, the term of this patent is extended or adjusted under 35 U.S.C. 154(b) by 209 days.

(21) Appl. No.: 15/890,212

(22) Filed: Feb. 6, 2018

Related U.S. Application Data

(63) Continuation-in-part of application No. 15/693,298, filed on Aug. 31, 2017, now Pat. No. 10,416,647, which is a continuation-in-part of application No. 15/140,422, filed on Apr. 27, 2016, now Pat. No. 9,903,699.

(51) Int. Cl.
*G01B 5/008* (2006.01)
*G05B 19/4097* (2006.01)
*B23Q 17/00* (2006.01)

(52) U.S. Cl.
CPC ....... *G05B 19/4097* (2013.01); *B23Q 17/003* (2013.01); *G01B 5/008* (2013.01); *B23Q 2717/006* (2013.01); *G05B 2219/37443* (2013.01)

(58) Field of Classification Search
CPC .................................................. G05B 19/4097
USPC ........................................................ 33/503
See application file for complete search history.

(56) References Cited

U.S. PATENT DOCUMENTS

| 5,193,286 | A | 3/1993 | Collier |
| 5,285,397 | A | 2/1994 | Heier et al. |
| 5,895,444 | A | 4/1999 | Ruck et al. |
| 6,019,554 | A | 2/2000 | Hong |
| 7,712,224 | B2 | 5/2010 | Hicks |
| 9,235,206 | B2 | 1/2016 | Benedict et al. |
| 9,903,699 | B2* | 2/2018 | Benedict ................ G01B 5/008 |
| 10,416,647 | B1* | 9/2019 | Benedict ................ G01B 5/012 |
| 2001/0008047 | A1 | 7/2001 | Okada et al. |
| 2007/0220767 | A1 | 9/2007 | Pettersson |
| 2010/0139107 | A1 | 6/2010 | Koinuma et al. |

(Continued)

OTHER PUBLICATIONS

International Search Report and Written Opinion issued to international patent application No. PCT/US17/29717, dated Aug. 7, 2017, 7 pages.

*Primary Examiner* — George B Bennett
(74) *Attorney, Agent, or Firm* — Cooley LLP

(57) ABSTRACT

A non-volatile computer readable storage medium has instructions executed by a processor to collect from a communication interface a first set of probe signals from a three dimensional axis gauge characterizing axis directions of a table. Axes directions for the table relative to a vise on the table are computed from the first set of probe signals. A second set of probe signals from electronic gauge blocks that characterize position of the table are collected from the communication interface. Actual table positions are computed from the second set of probe signals. Table position residuals between the actual table positions and desired table positions are computed. The table position residuals are conveyed to the communication interface.

8 Claims, 13 Drawing Sheets

(56) References Cited

U.S. PATENT DOCUMENTS

| | | |
|---|---|---|
| 2011/0054835 A1 | 3/2011 | Takamasu et al. |
| 2014/0007441 A1 | 1/2014 | Pettersson et al. |
| 2014/0157610 A1 | 6/2014 | Garvey et al. |
| 2014/0259715 A1* | 9/2014 | Engel .................. G01B 11/007 33/503 |
| 2015/0000148 A1 | 1/2015 | Abe |
| 2015/0091489 A1 | 4/2015 | Benedict et al. |
| 2016/0041068 A1 | 2/2016 | Wascat et al. |
| 2016/0054722 A1 | 2/2016 | Jalluri et al. |
| 2016/0195383 A1* | 7/2016 | Smith ................... G01B 5/012 33/502 |
| 2016/0195389 A1* | 7/2016 | Sagemueller ........ G01B 21/045 33/503 |
| 2016/0216098 A1 | 7/2016 | Hediger |
| 2017/0227343 A1 | 8/2017 | Singh et al. |
| 2017/0241759 A1 | 8/2017 | Werner et al. |
| 2019/0243335 A1* | 8/2019 | Chu .................. G05B 19/4097 |
| 2019/0302734 A1* | 10/2019 | Agarwal ............ G05B 19/4097 |

* cited by examiner

Table Of Raw X Axis Inspection Results For A Four Position Calibration Bar
(In Inches)

| Step | Desired | Raw DRO1 | Raw DRO2 | Raw ΔX(n) |
|---|---|---|---|---|
| 0 | 0.0000 | 0.0000 | 0.0002 | 0.0002 |
| 1 | 1.0000 | 1.0000 | 1.0003 | 0.0003 |
| 2 | 2.0000 | 2.0003 | 2.0005 | 0.0002 |
| 3 | 3.0000 | 3.0003 | 3.0004 | 0.0001 |
| 4 | 4.0000 | 4.0007 | 4.0007 | 0.0000 |

Figure 6A

Table Of Refined X Axis Inspection Results For A Four Position Calibration Bar
(In Inches)

| Step | Temperature and Runout Corrections TC DRO1 | TC + RC DRO1 | CNC Ref DRO 1 | Residuals CNC Ref DRO 1 - Desired |
|---|---|---|---|---|
| 0 | 0.0000 | 0.0000 | 0.0000 | 0.0000 |
| 1 | 1.0000 | 0.9997 | 0.9998 | -0.0002 |
| 2 | 2.0003 | 1.9996 | 2.0000 | 0.0000 |
| 3 | 3.0004 | 2.9993 | 2.9998 | -0.0002 |
| 4 | 4.0008 | 3.9993 | 4.0000 | 0.0000 |

Figure 6B

Table Of Simulated X Axis Inspection Results For A Four Position Calibration Bar
(In Inches)

| Step | 1st Ref. DRO1 | 2nd Ref. DRO1 | Residuals |
|---|---|---|---|
| 0 | 0.0000 | 0.0000 | 0.0000 |
| 1 | 0.9998 | 0.9998 | -0.0002 |
| 2 | 1.9999 | 2.0000 | 0.0000 |
| 3 | 2.9997 | 2.9998 | -0.0002 |
| 4 | 4.0000 | 4.0000 | 0.0000 |

Figure 6C

METHODS AND DEVICES FOR PERFORMING IN-SITU INSPECTIONS DURING A COMPUTER ASSISTED SETUP OF A MACHINE TOOL TABLE

CROSS-REFERENCE TO RELATED APPLICATIONS

This application is a continuation-in-part of U.S. Ser. No. 15/693,298, filed Aug. 31, 2017, which is a continuation-in-part of U.S. Ser. No. 15/140,422, filed Apr. 27, 2016, the contents of each parent patent application are incorporated herein by reference.

TECHNICAL FIELD

The present invention relates generally to numeric controlled machine tool tables. More particularly, the invention relates to methods and devices for performing in-situ inspections during a computer assisted setup of a machine tool table.

BACKGROUND

The parent patent applications referenced above describe CAS (computer assisted setup) processes and several automatic devices to provide first and second refinements of positions which improve the accuracy of a machine tool table. The advent of these new refinements improve the accuracy of machine tool tables and facilitate in situ inspections on the machine tool table, as disclosed herein.

Inspection of a fabricated part is typically carried out in a separate room, on a separate machine such as a coordinate measuring machine (CMM), after a part has been fabricated.

It is desirable to know the final inspection results prior to the part being fabricated, where CAD (computer assisted design) programs are typically used by a designer to design a part, and CAM (computer assisted manufacture) programs are typically used by a machinist to fabricate and manufacture parts. Inspection prior to fabrication or IPTF is a new CAS process introduced in this patent application where inspection may be carried out before each step of the CAM design for a fabrication process.

Fabrication tools must also be inspected. This inspection of the tools to determine their static geometric dimensions or offsets is typically carried out by an instrument such as a tool pre-setter before the tools have been used.

It is desirable to know the positions of fabricated features in the part that result from the dynamic offsets of the fabrication tools. For example, as the tools wear out during fabrication, the locations of these fabricated features will not be in their desired locations.

These dynamic offsets relate both to the known practice of a static geometrical description of the fabrication tools by a pre-setter, and to the physical result of fabricating a feature into a part. An apparatus and method for determining a third refinement, to automatically improve the accuracy of dynamic offsets and hence of fabricated features, is also disclosed herein.

During manufacture, a quality metric, such as Cpk, may be specified by the designer, near the beginning of the manufacture cycle so as to allow the designer to adjust and optimize the Cpk results during manufacture. This is described in more detail below related to the process for design for manufacture.

Shown in the top view of FIG. 1A is the machine tool table 101 with vise fixed jaw 102 and vise clamping jaw 103 holding a work piece 100. The work piece 100 is constrained in the X axis direction 140 by a probe engaging stop 114, in the Y axis direction 141 by the fixed vise jaw 102, and in the Z axis direction 142 by parallels 109 shown in FIG. 1B.

The probe engaging stop 114 has a reference surface 115 that may be set by a rigid probe 112 held in tool holder 111. The X axis reference position 450 of the spindle axis 106 is determined relative to an X axis electronic gauge block, not shown, as described in the previously cited parent patent applications.

The table has motion X axis direction 104, and motion Y axis direction 105. FIG. 1A also illustrates a tool holder 111, a measuring flexible probe 112 and a spindle 110. Refined positions described in the parent patent applications enable the machine tool table 101 to move in an X axis direction 104, which is in the same direction as the vise reference surface X axis direction 140, and the table motion Y axis direction 105 which is in the same direction as the vise reference surface Y axis direction 141.

FIG. 1B is a front view of the table direction (but not table motion) Z axis direction 142. The vise fixed jaw 102 has a vertical reference surface that also defines the vise Z axis direction 142 as is located in FIG. 1A by the intersection of the X axis 140 and the Y axis 141. The vise Z axis direction 142 is suitable for determining the spindle Z axis direction 106, and is defined by the vise as shown in the FIG. 1B front view when the vise is clamped to the table 101, as is standard machine shop practice.

Also shown in the FIG. 1B is the Z axis 106 for spindle 110 holding a tool holder 111 and measuring flexible probe 112. The spindle 110, tool holder 111 and measuring flexible probe 112 may be rotated about and translated relative to the table 101 in the Z axis direction 106. The determination of Z axis direction 106 is described in the parent patent applications to be parallel to vise Z axis direction 142.

X, Y, and Z, positions may be controlled using instructions with standard g and m codes stored in a memory of the CNC (Computer Numeric Controlled) mill (not shown). A remote computer (not shown) may have an RS-232 cable and a digital cable attached to the CNC mill to provide instructions to control the CNC mill.

Refined X, Y, and Z, positions may be measured by a flexible probe 112 and displayed by X, Y, and Z digital readouts of the CNC mill, not shown, as described in the parent patent applications. These flexible probes typically measure relative position, such as between two reference surfaces on or related to the table 101, and do not determine the X or Y spindle location of Z axis direction 106. As described in the parent patent applications, an electronic gauge block located on the table 101 (not shown in FIG. 1A) utilizing a rigid probe, not shown, comprising a shrink fit tool holder and a gauge pin, is useful to automatically determine the X and Y spindle location of Z axis direction 106. For example as described below in connection with FIG. 4A an X, a Y, and a Z axis electronic gauge block, not shown, together with a rigid probe, not shown, determines an X axis reference surface 450 and Y axis reference surface 460. A Z axis reference surface 470 shown in FIG. 5 is also established.

It is desirable to use the electronic gauge blocks' reference surfaces, probed and set by the rigid probe 112, to determine the location of reference surfaces 450, shown in FIGS. 1, 460, and 470 shown in FIGS. 4A, 4B and 5, and also described in the parent patent applications. The distance between the locations of reference inspection surfaces described herein and reference surfaces 450, 460, and 470 may be probed by measuring flexible probes 112.

Examples of typical measuring flexible probes 112 are made by the companies Renishaw sold by distributor MSC as Renishaw part number A-1036-0100, and made by Swiss Precision Industries (SPI) by distributor Higher Precision as part number 13-145-8. The Renishaw measuring flexible probe 112 has a sphere rather than a cylinder at the measuring tip, and features automatic operation with wireless transmission of the X, Y, and Z measuring information. The manually operated SPI measuring flexible probe 112 has a light that turns on when the cylinder measuring tip touches an X or Y edge.

In addition to measuring flexible probes, there are measuring flexible indicators, also known as dial indicators. These measuring flexible indicators may be held in tool holders, such as tool holder 111. A measuring flexible indicator touches a surface and provides an indication on for example a dial, of the amount of flexure of the indicator tip. An example of a measuring indicator is made by Westward as part number 2YNE2 sold by distributor Grainger. Measuring flexible indicators are useful to measure for example runout of a reference surface to an accuracy of ±0.0001 inches independent from the DRO reading.

It is desirable to hold an SPI measuring flexible probe 112 in a 90 degree fixture, in a tool holder 111, which allows it to measure Z axis positions, not shown in FIG. 1B but described in the detailed description in connection with FIG. 5.

Presently, typical processes for the fabrication and related inspection of the part 100 may call for accuracy at about ±0.005 inches. Typical high end processes for the fabrication of the part 100 may call for accuracy at about ±0.002 inches. Inspection of the part later after the part has been made is unlikely to reveal which step in the fabrication process may be causing an accuracy error.

It is desirable to have high end processes for fabrication and related inspection of part 100 calling for accuracies of about ±0.001 inches, or about ±0.0005 inches or about ±0.0002 inches with an IPTF process for inspection, and hence to know if a fabrication step will cause an error prior to the part 100 being ruined during fabrication in the event something is out of specification.

It is desirable to inspect the part 100 after each new orientation manipulation by the machinist and with an IPTF process to insure the part 100 is properly positioned in the vise. Improper seating is called seating failure, which is described below. Measuring flexible probe 112 is useful to inspect the part 100 for proper position in the vise after each new orientation manipulation, and to use this information to alert the machinist operator in the event something is out of specification with part 100 in the new orientation, with an IPTF process, thereby giving the machinist the chance to remedy the problem before the part may be ruined by the fabrication process.

The X, Y, and Z coordinate system locations with corrections for environmental conditions, referred to in the parent patent applications as the second refinement, can be made available to the machinist by reading the refined X, Y, and Z digital readouts. But this does not tell the whole story as these refined X, Y, and Z digital readouts just define the position of the Z axis 106 center axial location of the spindle 110.

Shown in FIG. 1B is the radius at location 122 of the tip 113 relative to the Z axis 106 location of measuring flexible probe 112 held in the tool holder 111 and spindle 110. This determines a radial offset of the actual X and Y locations of probed positions. This almost tells the whole story as the locations of interest for the probes or cutters have both a radial offset and a Z axis offset from the Z axis 106 center axial location of the spindle 110. For example, the measuring flexible probe tip 113 has point 122 with a radial offset from Z axis 106, and a Z axis offset from reference surface 119 on tool holder 111. In measuring the Y axis runout, the point 122 on measuring flexible probe tip 113 is used to touch points 120 and 121 on fixed vise jaw 102. The machinist refers to the digital readout locations of Z axis direction 106 so that when measuring flexible probe point 122 touches fixed jaw points 120 and 121 there is both a radial offset and a Z axis offset. When the radial offset is subtracted from the Y axis digital readout, and the Z axis offset is subtracted from the Z axis digital readout, then the correct readings for points 120 and 121 are obtained. This technique of subtracting radial offsets, and Z axis offsets, is standard practice for every flexible probe 112 or cutter held in the tool holder 111.

The measuring flexible probe 112 is useful for determining all the points in the refined orthogonal coordinate system that relate to the fabrication of a part 100 by the CNC mill according to an engineering drawing for part 100.

Unfortunately, features machined into part 100 have dynamic edge locations that vary with the cutter rotational speed, the cutter linear speed and direction, the cutter wear, the coolant and lubrication spray on the cutter, the cutter total indicated runout in spindle 110 and of tool holder 111. The cutter diameter will also reduce in size over the life of the cutter, due to cutter wear during fabrication, thereby continuously changing the radial dynamic offset of the cutter.

To tell the whole story, feature edge locations determined by the cutter's static geometrical offsets determined solely by a tool pre-setter, not shown, must be refined by dynamic offsets in order to agree with the desired feature edge locations.

It is desirable to fabricate edge locations of features more accurately with refined dynamic offsets. The accurate determination of these refined dynamic offsets describes the third refinement that improves the accuracy of locations of fabricated features on part 100.

From the machinist's perspective, the definition of the X, Y, and Z axes is first described by an object oriented engineering drawing for the part 100, typically prepared by a designer using a CAD program to define the objects related to part 100. The fabrication of the part 100 may involve the machinist to manipulate the part on the machine tool table vise in the X, Y, and Z axis directions so as to find suitable orientations to optimize the fabrication process typically prepared by a CAM program.

The process for fabrication of part 100 typically uses a CAM software program to determine the time sequenced steps (TSS) performed by the machinist using the CNC mill, and hence to determine the instructions for the CNC mill to fabricate the part 100 according to the engineering drawing for the part 100.

The vise with jaws 102 and 103 is used to hold the part 100 shown in FIG. 1B. The problem then becomes setting up the fixed vise jaw 102, rather than the part 100, to align with the X, Y, and Z axes described above. Once the vise is properly setup and positioned, the proper alignment to hold the part 100 with suitable manipulations in the vise, consistent with the engineering drawing is thereby established.

Failure to be properly positioned in the vise is called seating failure. Detecting seating failure in final inspection after the part 100 has been fabricated is difficult, and unlikely to be linked to the cause of the problem if the part is found to be out of specification in final inspection.

From the designer's perspective the engineering drawing for the part 100 is prepared typically by a CAD software program to determine object oriented features of the part. This may be accomplished by using layers for each object such as for: a coordinate system with multiple origins, construction lines, dimensions, virtual reference objects such as reference surfaces, and features such as holes, pockets, edges, and boundaries. While the designer may have an idea about the time sequence of the fabrication steps of these features, this may not be expressed in the engineering drawing for part 100 other than by specific notes. For example, the specific notes may say "deburr" all edges and thru holes. Furthermore, the designer may not be aware of the exact time sequence of the fabrication steps determined by the machinist on a CAM program.

After submitting the engineering drawing for part 100 to the machinist, the designer typically waits for the part to be delivered by the machinist meeting desired cost, schedule, and accuracy specifications.

It is desirable to notify the designer that there may be a problem, in the event the part may be out of cost, schedule, or accuracy specifications. This feedback step may start prior to fabrication, with the machinist sending a drawing back to the designer, from a machinist's CAS/CAM application to a designer's CAS/CAD application, including each TSS for the engineering drawing for part 100. The intention for these CAS applications is to implement new interactive features designed to work with both the CAM and CAD programs. This will also give the designer the chance to optimize the CAM process with inspections prior to fabrication (IPTF).

In addition to each TSS for fabrication of part 100 optimization, each TSS may be used by the designer to optimize inspections. Since inspection is typically carried out by the machinist after the part 100 is fabricated, in a separate CMM machine, the machinist is responsible for these inspections. Typically the designer performs an incoming inspection after the part has been fabricated on another CMM machine at the designer's facility to verify acceptance of the part 100.

It is desirable for the designer to have input to the inspection process using the CAS/CAD application with new features to optimize inspection at the machinist's facility carried out in situ on the CNC mill with a CAS/CAM application. Both before and after each TSS, using the interactive CAS/CAD and CAS/CAM applications, inspection data give a determination of all specifications including direct linkage to what is possibly causing a fabrication problem after the TSS, and more importantly IPTF inspection data give the best determination as to what may cause a problem before the TSS fabrication is executed. Hence typical inspections may be eliminated both at the machinist's CMM for final inspection and at the designer's CMM for incoming inspection.

Since time is of the essence for the machinist, the CNC mill operations must not be delayed waiting for interactive software programs to respond to each other. It is desirable to use enterprise cloud based applications such as available from IBM®, Oracle®, HP Enterprise®, and Google®, to optimize the data transfer of potentially large data files between CAS/CAD and CAS/CAM applications.

It is also desirable to make it easier for the machinist to interact with the CNC mill to improve the time delay problems. The machinist may prefer to talk to the CNC mill rather than program changes to the CAM program. A voice control microphone and microprocessor available from Knowles as part number IA8508 embed in an electronic gauge block located on the CNC mill table 101 will serve that need and can be implemented in the CAS/CAM application.

Voice control applications may use a virtual assistant. For example the popular Apple® cell phone uses the virtual assistant Siri®.

It is also desirable to have the virtual assistant interact with the machinist with an audible message coming from a speaker. A voice synthesis digital signal processing design platform, Audio Weaver® is available from DSP Concepts® to optimize speaker performance. A voice synthesis application may communicate the inspection results or messages to warn the machinist of fabrication issues related to inspections.

With the confidence that the part may be fabricated and inspected per the design, the designer may also optimize the process for manufacturability. Manufacturability is defined as achieving the best cost metric for a part that meets the specifications. It is desirable to be able to make changes to the design, and get feedback as to the best cost metric of the fabrication as related to manufacturability.

Since there are a large number of TSS combinations, and in addition the complication of using CNC mills with up to 5 axes which further increases TSS complexity, it is desirable to use an artificial intelligence (AI) program. For example the IBM® cloud based applications may use the AI program Watson®, with the capability to solve the TSS complexity problem, where a metric such as a cost, may be optimized for the best TSS order.

Once manufacture of for instance 100 pieces of part 100 starts, there is still more work for the CAS/CAM and CAS/CAD interactive software applications. For example after the first 10 pieces in the manufacturing cycle have been fabricated there is considerable statistical information about how well the specifications are being met. It is desirable to determine the quality metric Cpk for each piece as well as for each of the time sequenced steps for a piece. Review of this inspection information by the designer can result in changes to the design to further optimize the cost, schedule, and accuracy specifications.

SUMMARY OF THE INVENTION

A non-volatile computer readable storage medium has instructions executed by a processor to collect from a communication interface a first set of probe signals from a three dimensional axis gauge characterizing axis directions of a table. Axes directions for the table relative to a vise on the table are computed from the first set of probe signals. A second set of probe signals from electronic gauge blocks that characterize position of the table are collected from the communication interface. Actual table positions are computed from the second set of probe signals. Table position residuals between the actual table positions and desired table positions are computed. The table position residuals are conveyed to the communication interface.

BRIEF DESCRIPTION OF THE FIGURES

The invention is more fully appreciated in connection with the following detailed description taken in conjunction with the accompanying drawings, in which:

FIG. 6A shows a table of raw X axis inspection results.

FIG. 6B shows a table of refined X axis inspection results.

FIG. 6C shows a table of simulated X axis inspection results.

Like reference numerals refer to corresponding parts throughout the several views of the drawings.

DETAILED DESCRIPTION OF THE INVENTION

In situ inspections in the computer assisted setup of a machine tool table comprise three processes. First is the in situ inspection process for the CNC mill refined position accuracy that is determined by the three dimensional angle gauge for the first refinement and determined by both linear gauge blocks held by a calibration bar, and electronic gauge blocks, for the second refinement. Second is the in situ inspection process for the cutting tools that determines their dynamic offsets, as related to the features cut in situ by the cutting tools for the third refinement to the CNC mill accuracy. And third is the new process for fabrication determined by interactive communications between the designer using a CAS/CAD application and the machinist using a CAS/CAM application, featuring the IPTF process to insure specifications are being met by using in situ inspections.

The new fabrication process includes both the design for manufacture and the quality control optimizations which are now under control of the designer instead of the machinist, and give the designer new capabilities based on in situ inspections prior to fabrication, during fabrication, and during manufacture.

Figure 1A:
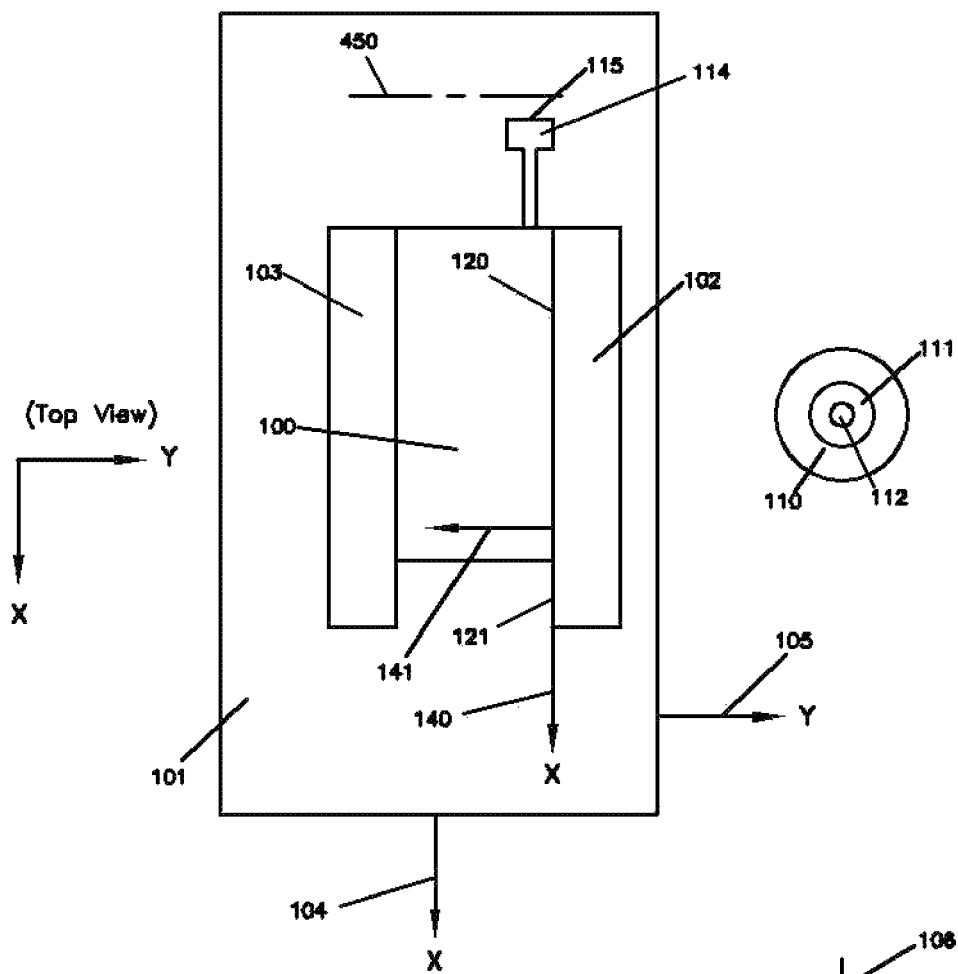
FIG. 1A shows a top view of a milling machine.
Figure 1B:
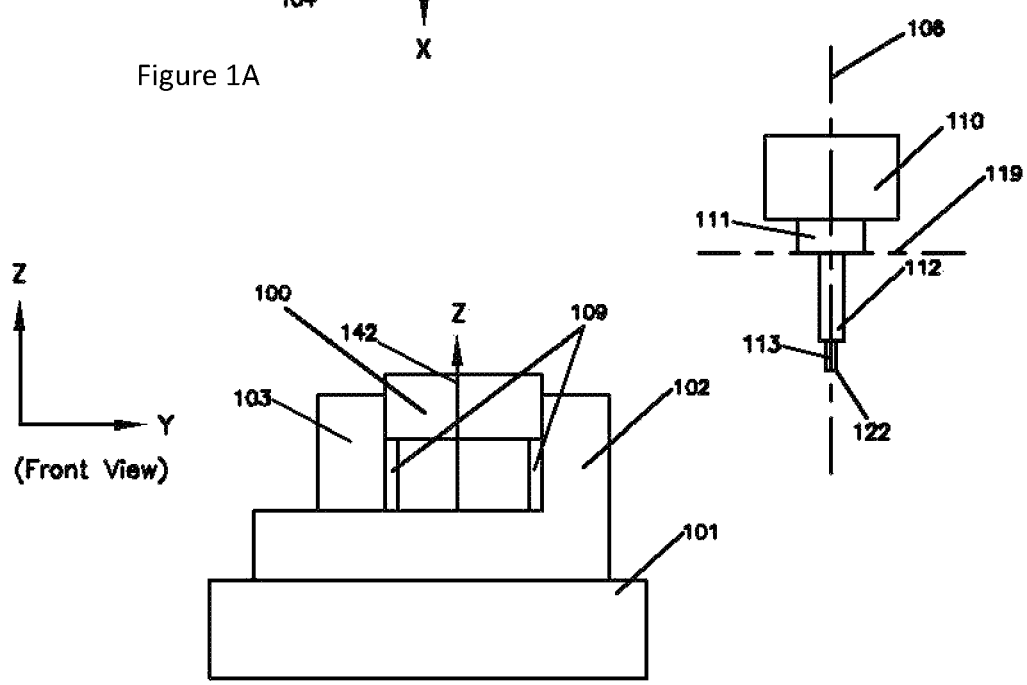
FIG. 1B shows a front view of a milling machine.
Figure 2A:
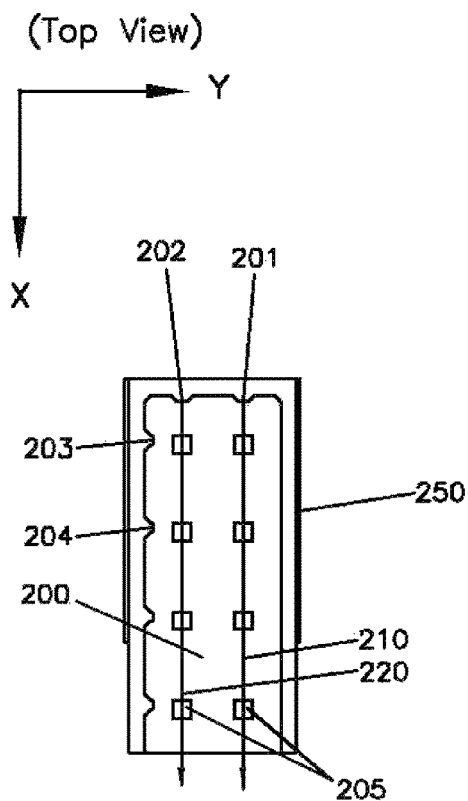
FIG. 2A shows a top view of a calibration bar used for inspection of refined positions.
Figure 2B:
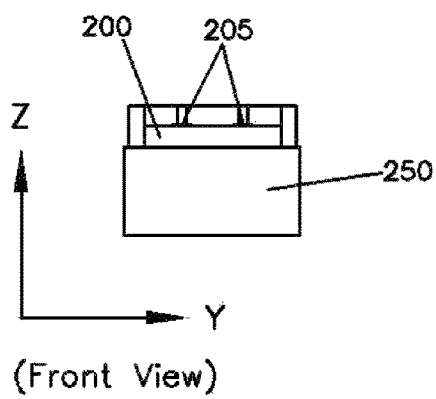
FIG. 2B shows a front view of a calibration bar used for inspection of refined positions.

For the first in situ inspection process, a four position calibration bar 200 is shown in the FIG. 2A top view and FIG. 2B front view. Attached to four position calibration bar 200 is block 250 which may be a precision 1-2-3 block intended to facilitate mounting in a vise, not shown, by a machinist. Reference surfaces 201 and 202 define an X axis reference surface that may be measured by a flexible probe 112 not shown. X axis directions 210 and 220 define the intended paths of the measuring flexible probe 112 relative to a vise X axis direction not shown. Note that in this discussion and others related to motions it is the table that moves in X and Y directions and not the probe 112. An alternate embodiment of the invention has a stationary table and a probe that moves.

Y axis reference surfaces 203 and 204 are useful to provide placement of linear gauge blocks as described below in connection with FIGS. 3A and 3B. Pads 205 provide Z axis reference surfaces for the linear gauge blocks at eight locations along intended paths 210 and 220, as shown in FIG. 2A and FIG. 2B.

Figure 3A:
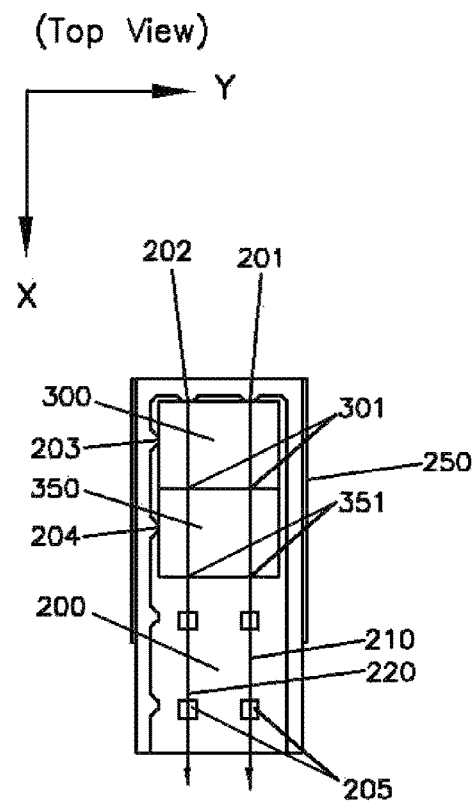
FIG. 3A shows a top view of the calibration bar with linear gauge blocks.
Figure 3B:
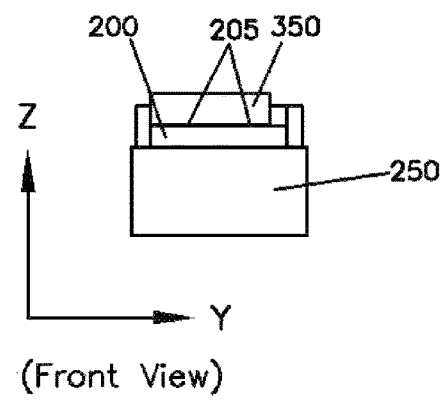
FIG. 3B shows a front view of the calibration bar with linear gauge blocks.

Linear gauge blocks 300 and 350 are shown inserted in four position calibration bar 200 in FIG. 3A top view and FIG. 3B front view. Linear gauge blocks 300 and 350 may be held in place by clamps not shown. The linear gauge block 300 is positioned against the X reference surfaces 201 and 202, the Y axis reference surface 203, and on two of the Z axis pads 205. The linear gauge block 350 is positioned against linear gauge block 300 X reference surface with points 301, the Y axis reference surface 204, and on two of the Z axis pads 205.

Figure 4A:
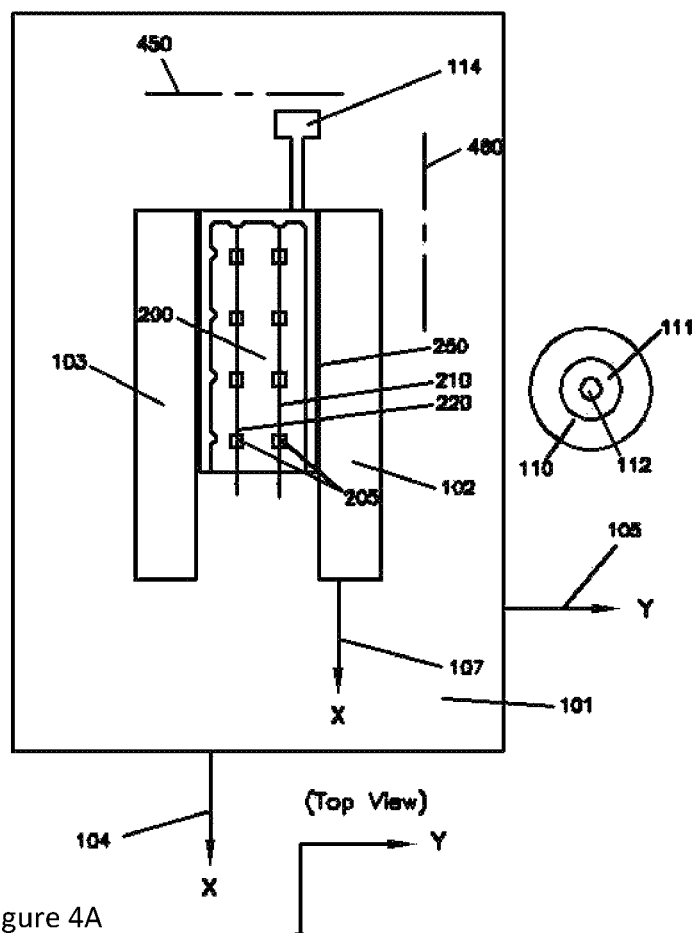
FIG. 4A shows a top view of the calibration bar in a vise used to determine X axis refined positions relative to X and Y axis reference surfaces.

FIG. 4A top view and 4B front view show four position calibration bar 200 with the block 250, mounted in a vise with fixed jaw 102 and clamping jaw 103, and on parallels 109. The vise with X axis direction 107 is mounted on table 101 with X axis motion direction 104.

The vise has previously been setup using a three dimensional axis gauge, not shown, so X axis direction 107 is in the same direction as table motion X axis direction 104. In addition, the X axis locations displayed on the refined X axis digital readout have been setup using linear gauge blocks and electronic gauge blocks, not shown, where reference surface 450 corresponds to the reference surface of the X axis electronic gauge block, not shown.

Measuring flexible probe 112, shown with tool holder 111 in spindle 110, may measure X axis positions along path 210 at points 201, 301, and 351, previously defined in connection with FIG. 3A, and along path 220 at points 202, 301, and 351, previously defined in connection with FIG. 3A, all relative to X axis reference surface 450. Inspection of the residuals should indicate that the accuracy is within ±0.0002 inches. Further discussion of the residuals is described below in connection with FIG. 6A, FIG. 6B, and FIG. 6C.

Similar to the inspection of the X axis residuals, four position calibration bar 200 may be mounted (not shown) in the vise with the paths 210 and 220 in the Y axis direction 105. Y axis accuracy may now be determined relative to electronic gauge block reference surface 460 and table and vise Y axis direction 105. Inspection of the residuals should indicate that the Y axis accuracy is within ±0.0002 inches.

Figure 5:
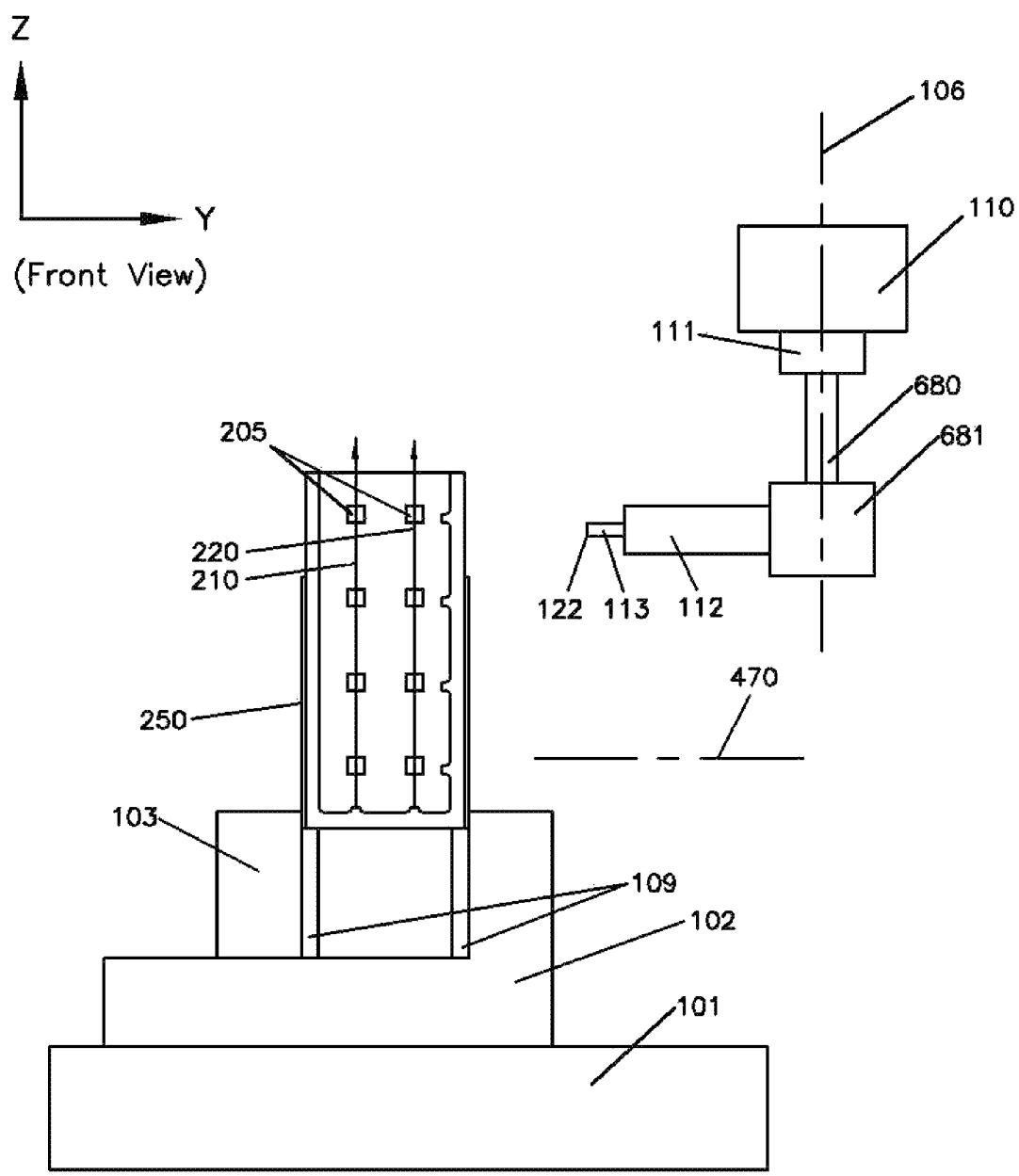
FIG. 5 shows a front view of the calibration bar in a vise used to determine the Z axis refined positions relative to a Z axis reference surface.

Similar to the inspection of the X axis residuals, four position calibration bar 200 may be mounted on parallels 109, in the vise with fixed jaw 102 and clamping jaw 103 as shown in FIG. 5 with the paths 210 and 220 in the Z axis direction 106. Z axis accuracy may now be determined relative to electronic gauge block reference surface 470 and table and vise Z axis direction 106. Inspection of the residuals should indicate that the Z axis accuracy is within ±0.0002 inch.

Figure 4B:
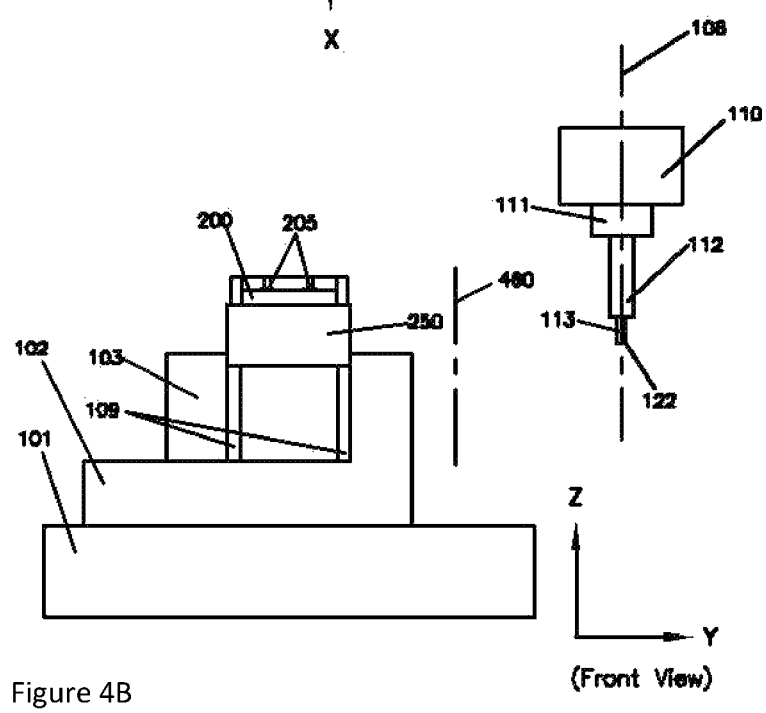
FIG. 4B shows a front view of the calibration bar in a vise used to determine X and Y axis refined positions relative to X and Y axis reference surfaces.

An SPI measuring flexible probe 112 is shown in FIG. 5 held in a 90 degree fixture 681, by an extension 680 held in a tool holder 111, which allows it to measure Z axis positions on four position calibration bar 200. The 90 degree fixture 681 also allows measuring flexible probe 112 to snap back and forth to a position in line with axis 106 as shown above in FIG. 4B. The in line position is necessary to allow tool holder 111 to automatically store and change tools such as the measuring flexible probe 112 in a tool storage device on the CNC mill not shown.

In the discussion above, four position calibration bar 200 may hold four 1 inch linear gauge blocks. In another embodiment other calibration bars may hold for example ten or more 1 inch gauge blocks. And in another embodiment the linear gauge blocks do not need to be 1 inch as it may be useful to use other lengths of the gauge blocks.

FIG. 6A presents a table of inspection results for the raw measurements of X axis accuracy by the four position calibration bar 200 described in connection with FIG. 4A above. In step 0 the measuring flexible probe 112 measures both the point 201 along path 210 and the point 202 along path 220. DRO1 values are for path 210 and DRO2 values are for path 220.

At point 201 the DRO1 is set to zero, corresponding to the desired position of 0.0000". At point 202 the X axis DRO2 reading determined by the probe 112 was 0.0002".

In practice there will be a small deviation, $\Delta X(n)$ at each step n, between the raw X locations of desired reference surface points 201 and 202 because of errors in four position calibration bar 200 during fabrication to within accuracy of ±0.002 inches.

The value of $\Delta X(0)$ for step 0 is 0.0002 inches. At each new 1 inch step to new linear gauge block positions the difference between locations labeled DRO1 and DRO2 must agree within $\Delta X(0)$±0.0002 inches. By checking this condition, the linear gauge blocks are assured to be properly seated.

The raw DRO1 and DRO2 and $\Delta X(n)$ values for steps 0 through 4 are shown in FIG. 6A where each step corresponds to inspection data for additional 1 inch linear gauge blocks. As described above the designer may choose to use other values besides 1 inch for the linear gauge blocks for the inspection.

We now focus on the refined positions of DRO1, which was set to zero at step 0. In typical operation, and in this case inspection, the first and second refinements are automatically determined per the CAS setup operations.

For the example data presented in the table in FIG. 6B, the first and second refinements are determined manually by the operator, and not by the automatic CAS process.

Only temperature corrections (TC) are required for the second refinement. The relative humidity does not affect steel linear gauge blocks or the CNC mill so this correction is not required. The table was set to 0.00 degrees tilt±0.1 degrees for both the X and Y axis tilts so no correction for table tilt was required.

The second column data shown in the refined results in FIG. 6B shows the values for TC (temperature corrected) DRO1 values corrected for contraction of the steel linear gauge blocks between the measured temperature which was 65° F. and the calibration standard temperature of 68° F.

The coefficient of thermal expansion for steel is alphaST=0.000006 inches per ° F.

The temperature change $\Delta T$ is 65° F.-68° F.=-3° F. thereby giving the temperature corrections for the contraction (hence an expansion):

TC $DRO1=(1-\text{alpha}ST*\Delta T)*DRO1$.

The first refinement runout corrections determined by the three dimensional axis gauge are required for automatic CAS values, however for this data set in the third column for the runout correction (RC) is determined by direct measurement of the vise direction errors and the four position calibration bar 200.

The third column shows TC+RC (the runout correction) DRO1, where the runout error is caused by both a fabrication error in the four position calibration bar 200 and runout error of four position calibration bar 200 held in the vise of –0.00018" per inch as determined by direct measurements.

The CNC Mill contracts by 0.00016 per inch of X axis runout at 65° F. so the column four results correct the data for the calibration standard temperature of 68° F. Referring to the automatic calculation of the second refinement values in the parent patent applications the values of the coefficients are: Ax is 0.99964, Bx is zero, and Cx is zero per the data base for the entry values of: temperature is 68° F., humidity is 50% (or any value), table tilt is zero in X and Y directions.

The fifth column shows the residuals satisfy the accuracy tolerance of ±0.0002 inches. The residuals are defined as the actual values minus the desired values.

FIG. 6C shows the same data and corrections simulated as they would be corrected by an automatic CAS process. The $1^{st}$ refinement corrects the raw DRO1 values in column 3 of FIG. 6A for the angle error of the four position calibration bar 200 held in the vise of –0.00018" per inch with the results shown in column 2. The results of column 2 are then corrected for the 2nd refinement, which in this case is just a temperature expansion of 3° F. thereby giving the column 3 results. The final column 4 residuals are within the accuracy of ±0.002 inches as predicted.

Figure 7A:
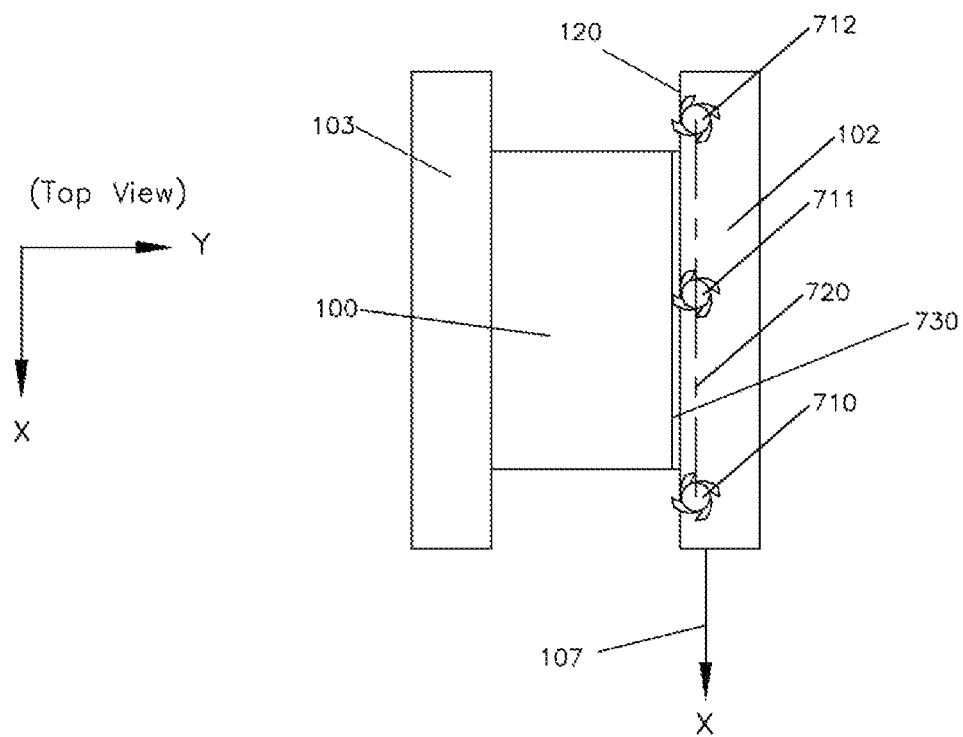
FIG. 7A shows a top view of a part being fabricated in the milling machine.
Figure 7B:
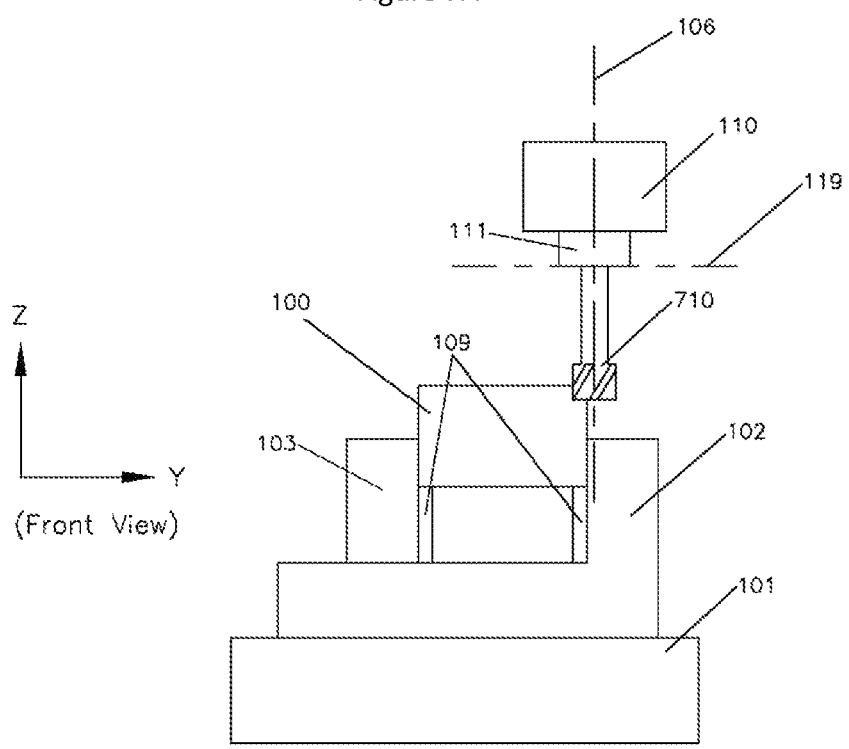
FIG. 7B shows a front view of a part being fabricated in the milling machine.

The second in situ inspection process, which determines dynamic offsets of the cutting tools, as related to the features cut in situ by the cutting tools, thereby determines the third refinement to the CNC mill accuracy. As shown in the FIG. 7A top and FIG. 7B front views, a cutter shown in positions 710, 711, and 712 is used to cut an edge 730 in the fabrication of part 100, held in vice jaws 102 and 103, and seated on parallels 109.

Typically the table (not shown) moves in the X axis direction 107 to make the cutter appear to move from position 710 to 712 at a linear velocity called the feed rate. Since it is customary for the apparent cutter motion to be described instead of the table motion, we will use this description in the following discussion.

The apparent cutter motion is along path 720 described by the X and Y locations of the spindle Z axis direction 106. The desired edge 730 is offset in the Y axis direction from path 720. The dynamic offset between path 720 and edge 730 is determined in the setup of the machine tool table as described below in connection with FIG. 9.

Figure 8A:
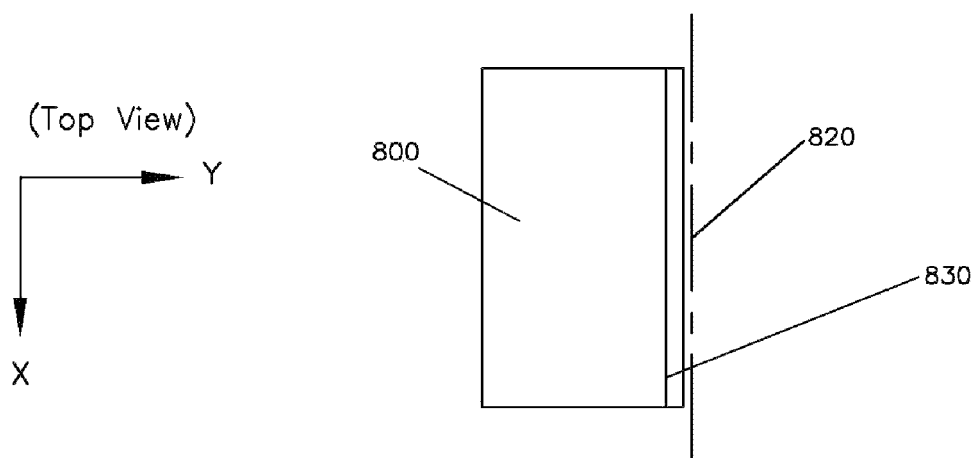
FIG. 8A shows a top view of the bar used to determine cutter dynamic offset.
Figure 8B:
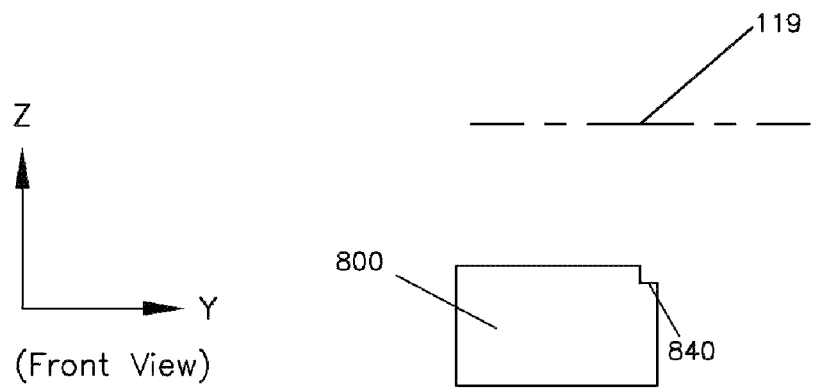
FIG. 8B shows a front view of the bar used to determine cutter dynamic offset.

An offset reference block 800, may be used to determine the dynamic offsets of the cutter as shown in the top view of FIG. 8A and front view of FIG. 8B. The offset reference block 800 is used in the computer assisted setup of the machine tool table, using vise jaws 102 and 103 not shown. Separate blocks 800, made from the same material as part 100, are required for each material used for part 100. The vise jaws 102 and 103 not shown have been aligned with the conditions for the first refinement thereby making sure there is no Y axis or Z axis direction runout.

The cutter is used to cut edge 830 in block 800, at the standard operating conditions for the cutter of feed rate, lubrication and cooling spray, and the cutter total indicated runout in spindle 110 and tool holder 111. The Y axis location of path 820 is determined by the refined digital readout value Y. A measuring probe, not shown, measures the refined digital readout value Y of the edge 830. Hence the dynamic offset of the cutter is accurately determined by the difference between the Y values of path 820 and edge 830. This determines the dynamic offset used for the radial offset that can be used for both X and Y axis directions.

The Z position of tool holder 111 reference surface 119 is determined by the refined digital readout Z. And the measuring probe, not shown, measures the refined digital readout of the edge 840. Hence the dynamic offset of the cutter is accurately determined by the difference between the Z values of tool holder 111 reference surface 119 and edge 840, for the offset in the Z axis direction.

Figure 9:
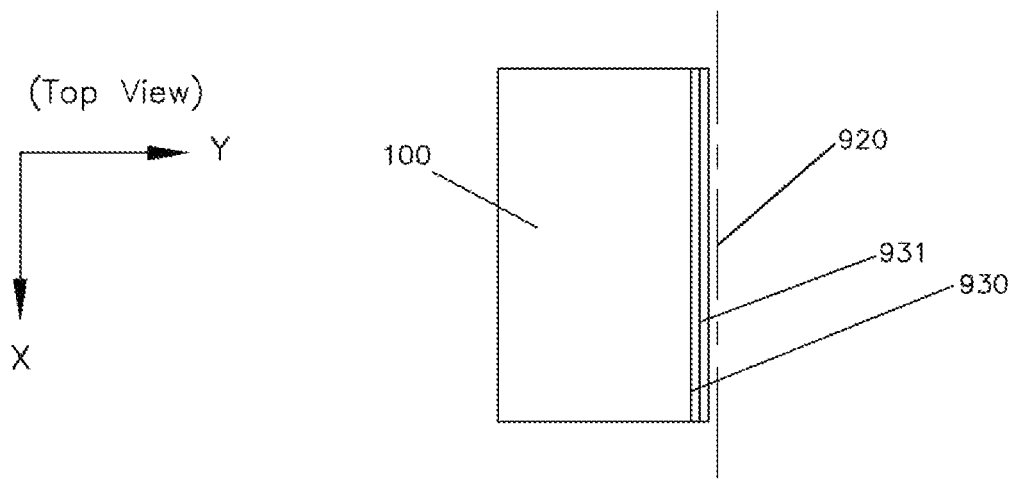
FIG. 9 shows a top view of the part with a virtual reference surface used to determine cutter dynamic offset.

Referring to the FIG. 9 top view, we return to the discussion of the fabrication of part 100 where it is desired to cut edge 930. The path 920 has been previously determined in the computer assisted setup of the machine tool table, as having the correct dynamic offset for the cutter not shown. However, because cutters wear out during use, there is a possibility that the cutter is worn and has a smaller diameter. Hence the correct dynamic offset may now be more than originally measured. Since it is well known that this wear is small we can assume that it is less than 0.010 inches.

Instead of using path 930, a path offset to the right from path 930 by 0.0100 inches is used to fabricate edge 931 as shown in FIG. 9. Edge 931 is now referred to as a virtual reference surface.

The virtual reference surface 931 may be measured by a probe, not shown, and its location with a Y value determined. The difference between the desired edge position 930 and the actual position of surface 931 determines the correction due to cutter wear to apply to the current cutter path 920 to fabricate edge position 930 with the best accuracy.

In conclusion, we have presented three refinements to standard machine shop practice that improves the accuracy about ten times from ±0.002 inches to ±0.0002 inches.

In addition, the new process of inspection prior to a fabrication step assures that every specification of the fabricated part is within tolerance. Errors that would typically ruin the part are determined and remedied by the machinist, the designer, and the virtual assistant, described below, to improve the manufacturing process.

In order to make best use of these refinements, new interactive features in the CAM software operated by the machinist are implemented using CAS/CAD and CAS/CAM applications. Voice activated features executed by the machinist allow the machinist to control features of the CAM software by giving voice commands to a virtual assistant, referred to herein as Cassie. Cassie may also use a voice synthesis application and a speaker to communicate inspection data and warnings to the machinist.

Figure 10:
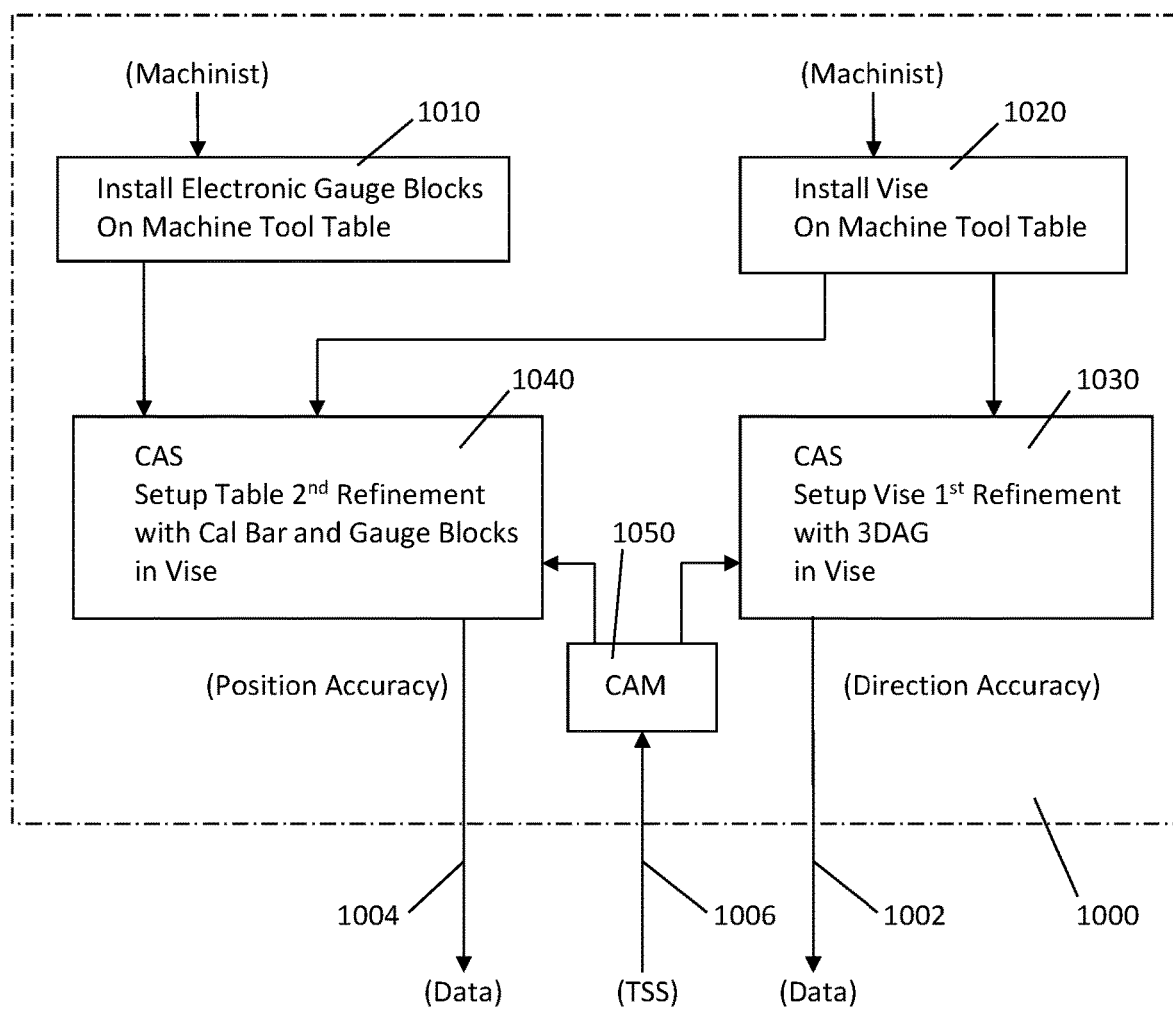
FIG. 10 shows a flow chart for a process to inspect machine tool table accuracy.

Starting with the viewpoint of the machinist the CNC mill is inspected for accuracy, and a flow chart of the method 1000 is shown in FIG. 10. Electronic gauge blocks are installed by the machinist on the machine tool table, per element 1010, along with a vise per element 1020. The vise setup for the first accuracy refinement using the three dimensional axis gauge (3DAG) per element 1030, and the CNC mill table setup for the second accuracy refinement using the calibration bar (Cal Bar) with linear gauge blocks per element 1040 are the machinist responsibilities.

The machinist provides inputs for CAS processes 1030 and 1040, with time sequenced steps, TSS 1006, to the CAM program 1050. The inspection data 1002 for the axis accuracy and DRO accuracy 1004 may be output to the machinist over a speaker, not shown, or a CAS/CAM application to a designer's CAS/CAD application, not shown.

The machinist may voice command "Cassie execute X axis $1^{st}$ refinement using the 3DAG." and Cassie will prompt the machinist to place the 3DAG in the vice, and will make the data measurements together with the machinist operations to manipulate the 3DAG so that the X axis runout data 1002 in the Y and Z directions may be determined.

Similarly, the machinist may voice command "Cassie execute X axis $2^{nd}$ refinement using the Cal Bar." and Cassie will prompt the machinist to place the Cal Bar in the vise and will make the data measurements together with the machinist operations so the X axis calibration data 1004 may be determined.

Additional voice commands "Cassie display X axis $1^{st}$ refinement data." or "Cassie display X axis $2^{nd}$ refinement data." will display the data on the remote computer screen. Operating from the remote computer, the machinist may also send the data from the CAS/CAM application to the designer's CAS/CAD application. Such a voice command may be "Cassie send $2^{nd}$ refinement data to designer."

Figure 11:
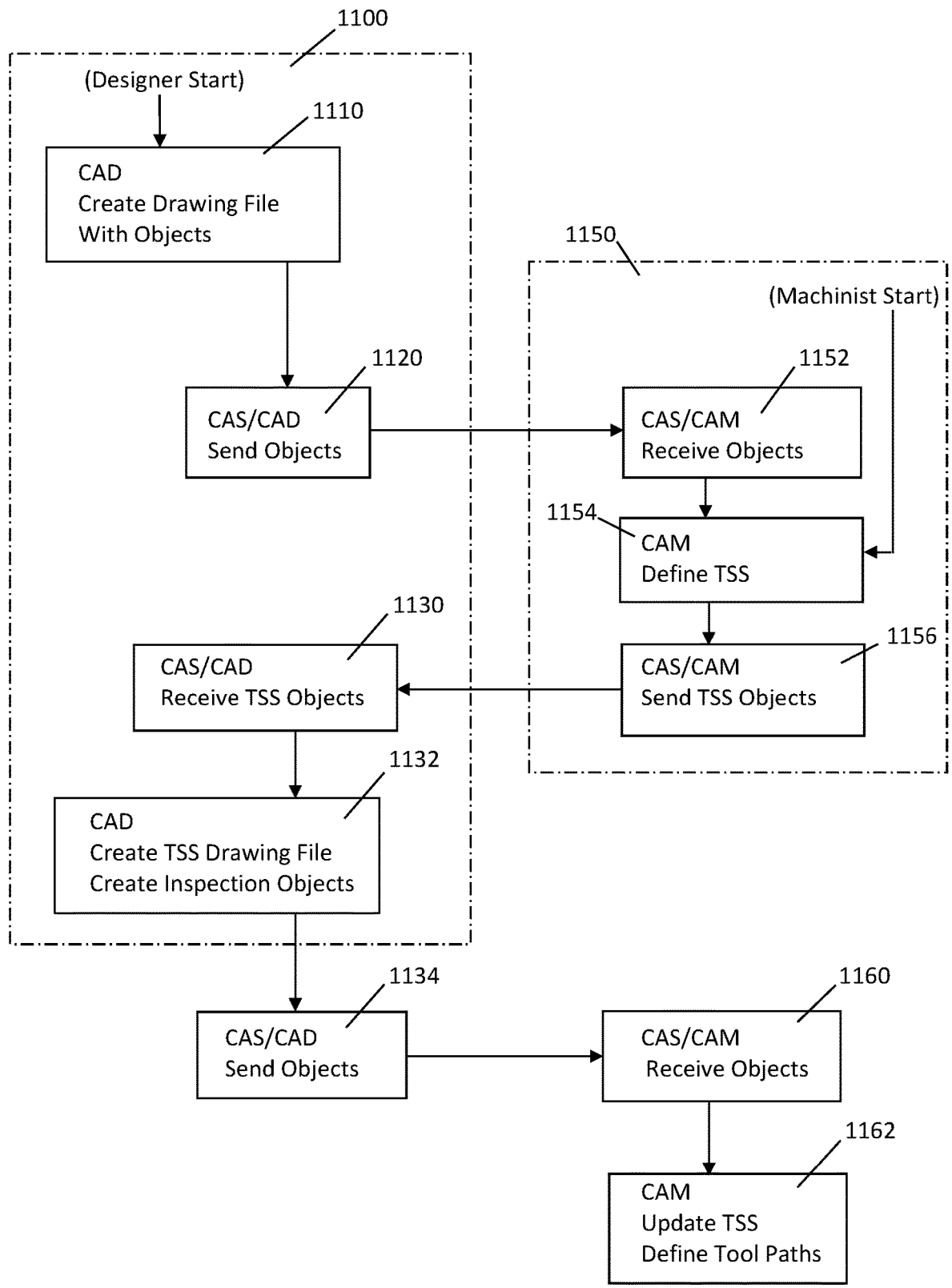
FIG. 11 shows a flow chart using CAS/CAD and CAS/CAM applications for fabrication and inspection to provide time sequenced steps to the designer.

The first responsibility for the designer using the CAD program, is to use the fabrication process 1100, to design the part per CAD element 1110, by creating the objects as shown in FIG. 11.

Using inputs from the designer's CAS/CAD application element 1120, sent to the machinist per CAS/CAM element 1152, the machinist uses the CAM program element 1154 to define the time sequenced steps TSS, for the tool paths for fabrication or inspection of the part.

The CAM program output per CAS/CAM application element 1156 is organized by how the part looks during each step of the part fabrication. The initial TSS would show the part as a raw stock piece of material with an orientation defined by the vise.

CAS/CAD application element 1130 receives the TSS objects from the CAS/CAM element 1156. Additional fabrication and inspection object features defined by the designer using the CAD program per element 1132 are sent from CAS/CAD application element 1134 to the CAS/CAM application element 1160 and continue to show how the part will look during each time sequenced step.

The inspection objects are sent to the machinist, so that per CAS/CAM application element 1160 the CAM software program 1162 can upgrade the tool paths so flexible touch measuring probes and indicators used by the machinist on the CNC mill may determine the accuracy for every feature the designer deems to be important. The designer may also specify the desired accuracy of that inspection step for each object.

Now the designer can create a design for the inspection objects for the part for each TSS per CAS/CAD element 1132. Inspection prior to fabrication, IPTF, inspections can be performed prior to a fabrication of the part for that step. The inspection objects are sent to the machinist so that per CAS/CAM element 1160 the CAM software program 1162 can upgrade the tool paths so flexible touch measuring probes and indicators used by the machinist on the CNC mill may determine the accuracy for every feature the designer deems to be important. The designer may also specify the desired accuracy of that inspection step for each object.

A validation object is a redundant after fabrication inspection object shown below in the TSS fabrication process 1200 in FIG. 12. Failing a validation object as per CAS/CAM application element 1250 below, for the inspection of the accuracy of the vise and the table is cause for the machinist to abort the part fabrication as described below. Failing a validation inspection may mean that the part has been ruined. Validation objects are also important for the manufacture of the part as described below in connection with FIG. 14.

As validation inspections add extra cost to a job they are performed only as a last resort where IPTF inspections prove to be marginal. If the accuracy specification is a critical value that must be checked, then the designer may choose to include the validation.

There will be a correlation between the desired accuracy, the number of inspection steps, and the cost of the part. There will also be a correlation between the desired accuracy, the fabrication of the objects, and the cost of the part. This will be examined in more detail below in connection with FIG. 13 and the design for manufacturability.

Figure 12:
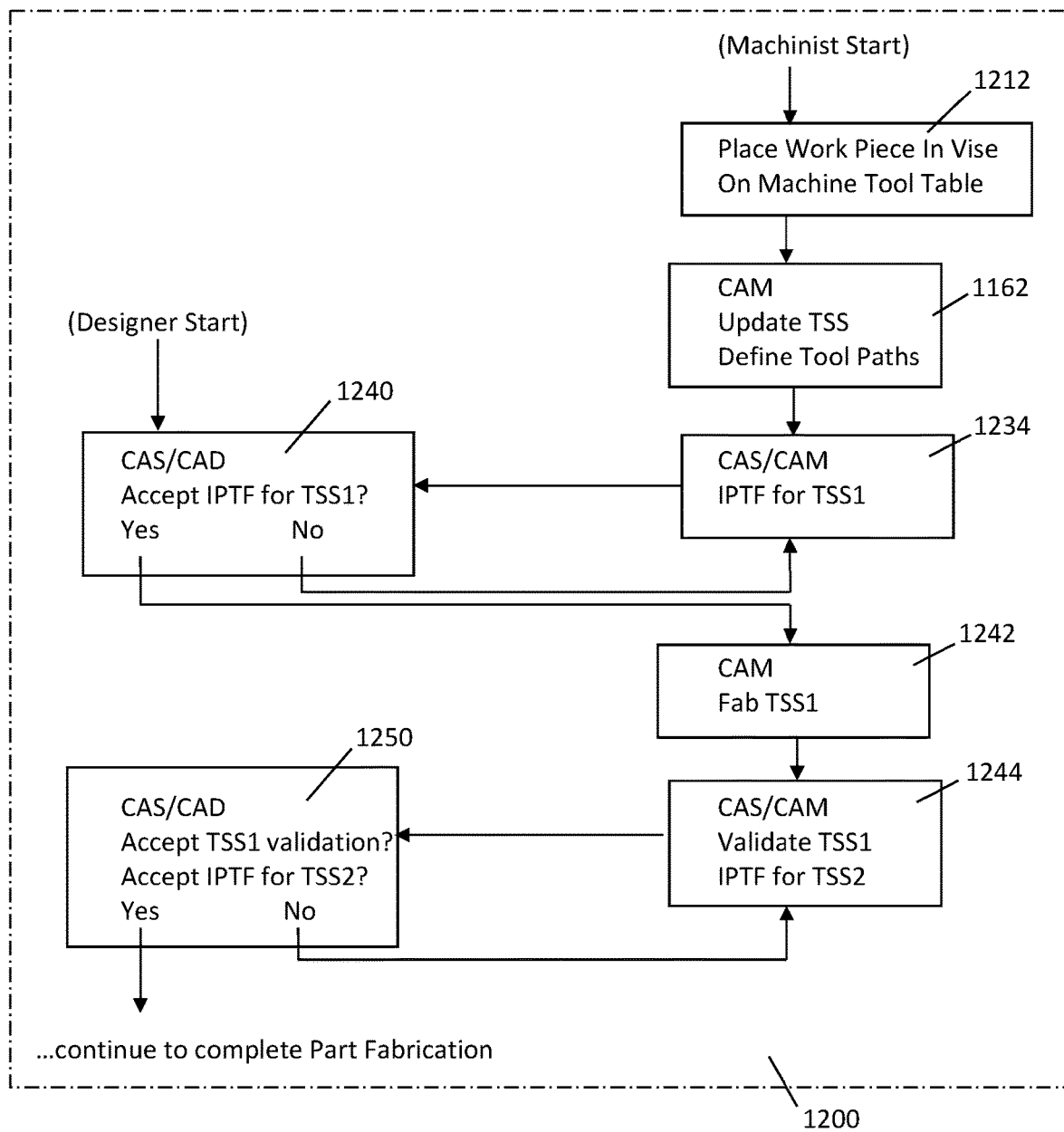
FIG. 12 shows a flow chart for CAS/CAD and CAS/CAM applications to optimize fabrication and inspection featuring IPTF.

As shown in FIG. 12 for the TSS fabrication process 1200, the starting point is element 1212 where the machinist places the work piece in the vise on the machine tool table. The CAM process 1162 has the updated TSS for each tool path. CAS/CAM application element 1234 sends the results of the IPTF for TSS1 to the designer. The designer is now in the fabrication process loop, and per CAS/CAD application element 1240 must decide to accept the IPTF result for TSS1.

If the residuals in CAS/CAD application element 1240 are greater than the specified accuracy by the machinist per CAS/CAM application element 1234 then the inspections are not accepted per CAS/CAD application element 1240 and there is a problem. Collaboration may be required between the designer, the machinist and the virtual assistant Cassie, to determine the cause of this problem.

A voice command "Cassie display environmental values." may help resolve the problem if it is related to the CNC mill. Remedy of the problem may involve determination of a machinist error, a designer error, or a faulty CNC mill. Cassie has data for the environmental values measured for each TSS that may be relevant to the CNC mill faulty performance for that step, and IPTF data before each step will also notify the machinist if the CNC mill is in thermal shock or in physical shock. Validation data after each step may also be useful.

The settings for triggering a thermal shock or physical warning by Cassie may also be adjusted by voice command "Cassie adjust thermal shock delta T to 0.5 degrees F." or "Cassie adjust x axis table tilt delta theta to 0.2 degrees."

Once a remedy is found CAS/CAM application element 1234 may be repeated with the expectation that the new residuals will be accepted per CAS/CAD application element 1240. Failure to remedy the problem is cause for the machinist to abort the fabrication of the part.

Once CAS/CAD application element 1240 accepts the TSS1 validation, the CAS/CAM application element 1242 may proceed to start fabrication of the first step TSS1 for the part.

Proceeding to CAS/CAM application element 1244 the validation of the part per TSS1 may proceed if necessary. If the residuals in CAS/CAD application element 1250 for TSS1 validation are greater than the specified accuracy by the machinist per CAS/CAM application element 1036 then the inspections are not accepted per CAS/CAM application element 1250 and there is a problem. Collaboration between the designer, the machinist and the virtual assistant Cassie are required to determine the cause of this problem. Remedy of the problem may involve determination of a machinist error, a designer error, or a faulty CNC mill. Once a remedy is found CAS/CAM application element 1250 for TSS1 may be repeated with the expectation that the new residuals will be accepted per CAS/CAD application element 1244. Failure to remedy the problem is cause for the machinist to abort the fabrication of the part.

Once CAS/CAD application element 1250 accepts the TSS1 validation, the CAS/CAM application element 1244 may proceed to start IPTF for the step TSS2 for the part. Inspection of TSS2 using CAS/CAM application element 1244 provides the values used by CAS/CAD application element 1250 similar to the previous CAS/CAD application and CAS/CAM application steps. In this manner the processes may continue to complete the part fabrication.

Figure 13:
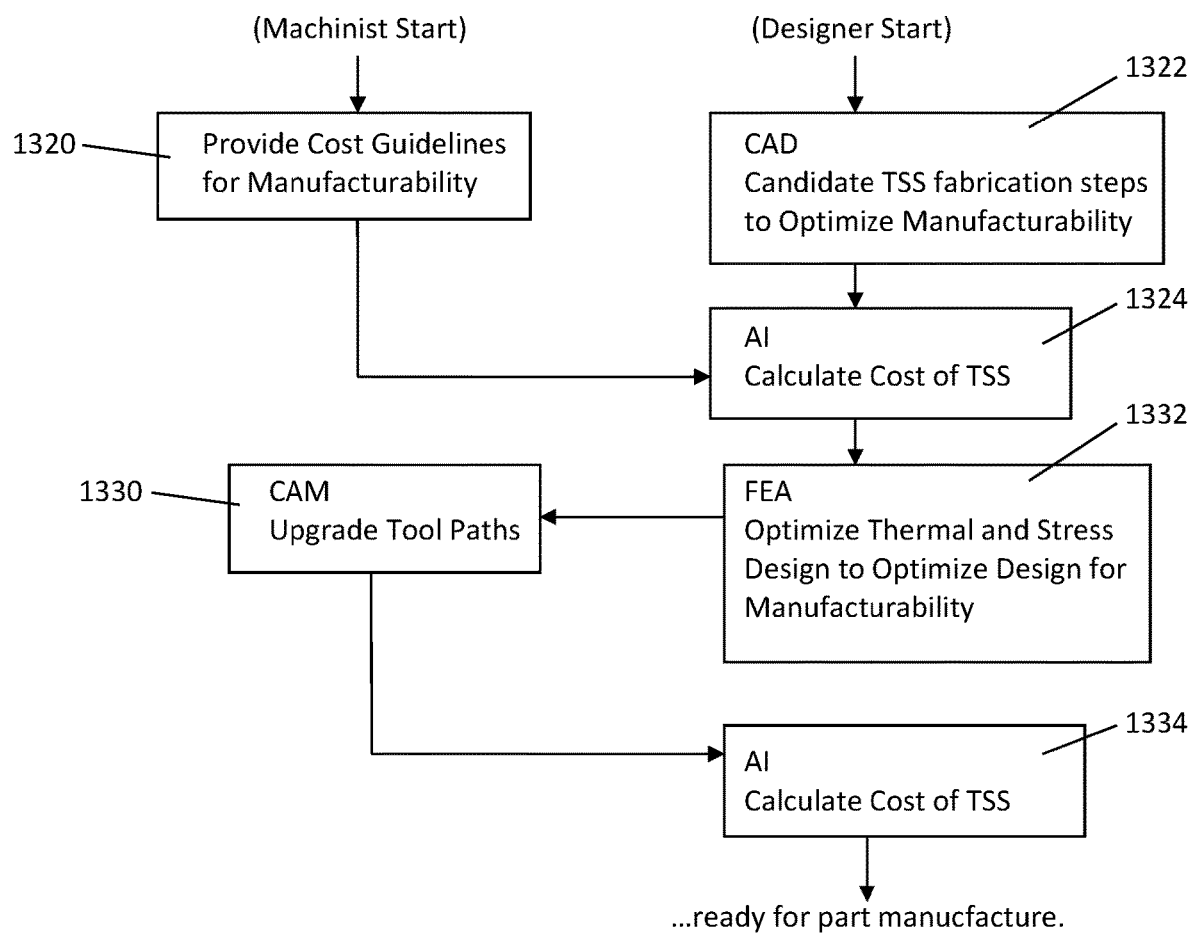
FIG. 13 shows a flow chart for a process to optimize design for manufacturability.

FIG. 13 shows a flow chart for the design for manufacturability process (DFM process). This DFM process involves determining the optimum cost of manufacturing a part. The cost of fabrication of the part is determined from the TSS fabrication process 1200 described in FIG. 12. With this starting point the designer may vary the TSS fabrication process in several different ways. For example the order of the TSS fabrication may be changed, so that if there are N steps there may be N! ways for the DFM process, where for example if N=5 steps then N!=120 possible ways. Another example is the use of a four or five axis CNC mill which may be used to improve the DFM process, because a TSS where the machinist manipulates the part to seat properly in the vise and related inspection may be eliminated.

The machinist provides guidelines CAS/CAM application element 1320 for the cost of each service performed by the CNC mill. This menu of services may include standard, custom, and proprietary services.

The designer provides a set of candidate TSS fabrication steps to CAS/CAD application element 1322. The complexity of the number of these possible candidates in the set is problematic.

Calculator CAS/CAD application element 1324 is used to determine the optimum cost of the DFM process. Comparison of the candidates is best performed by using an AI process such as Watson where the lowest price will generally be the preferred process for manufacture.

With a preferred candidate TSS in mind the designer may continue to improve TSS fabrication for DFM. FEA (finite element analysis) may be used to generate a digital model of the part. Design changes may be made to the digital model and tested to insure the part meets the desired performance specifications. For example thermal and stress testing may be performed on the digital model of the part to check that design changes which may optimize DFM are consistent with the intended performance of the part.

The designer may use an FEA CAS/CAM application element 1332 to optimize the digital model for the part. In this case the optimized digital model is sent to TSS fabrication process 1200 to provide the new tool paths and TSS fabrication. CAM process 1330 updates the tool paths and CAS/CAD application element 1334, similar to CAS/CAD application element 1324 determines the cost of the new TSS, thereby providing an optimized DFM ready for part manufacture.

Figure 14:
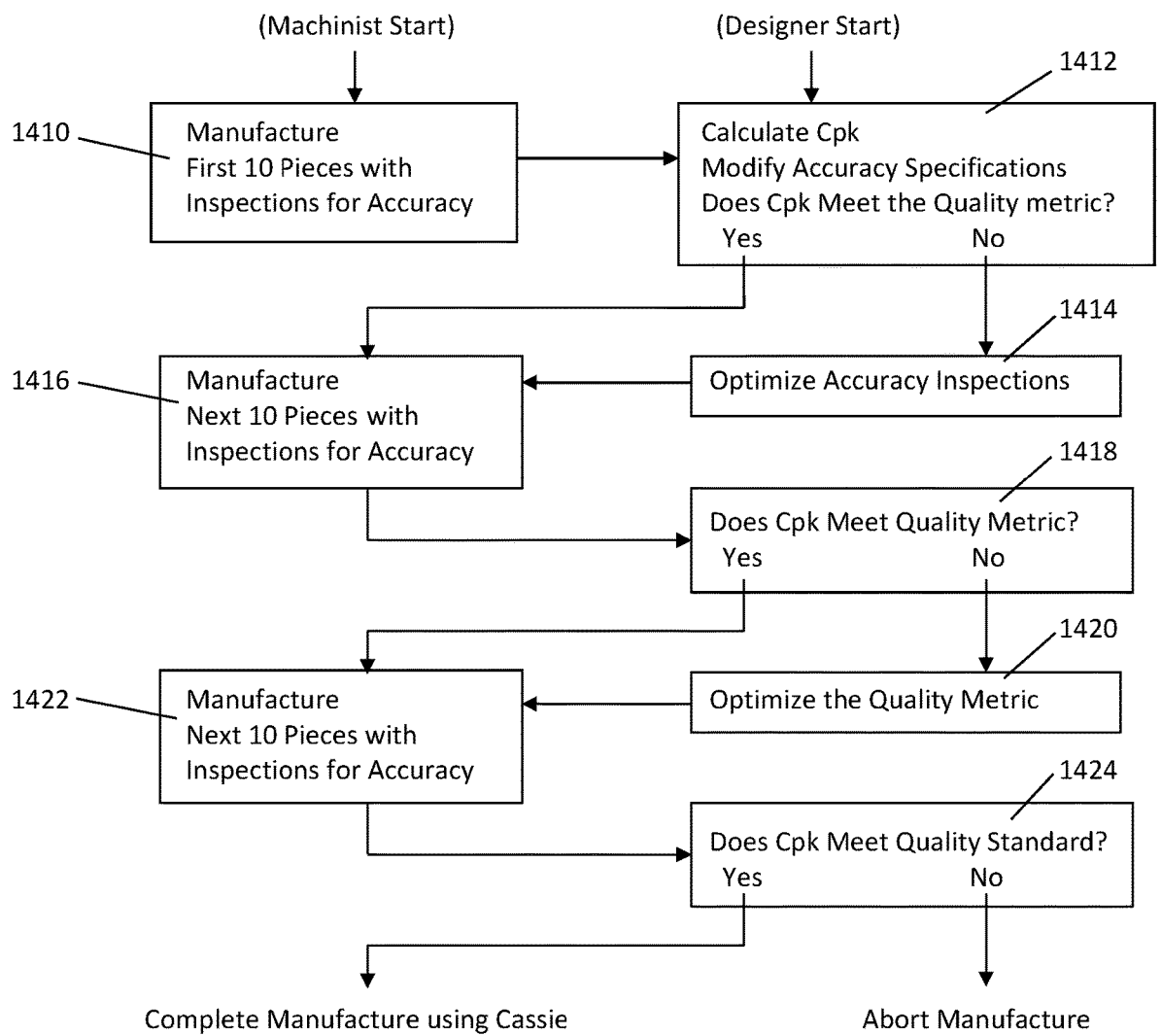
FIG. 14 shows a flow chart for a process to optimize manufacture.

The process for manufacture of for instance 100 pieces shown in FIG. 14 starts with the machinist completing the first 10 pieces using the CAS/CAM application element 1410, whereby each piece is fabricated per the TSS fabrication process 1200 described in FIG. 12 above. The IPTF of objects and validations for each TSS for each piece are sent to the designer using CAS/CAD application element 1412.

Using CAS/CAD application element 1412 the designer may calculate the Cpk for each TSS of each piece from the statistical results of how the residuals for each TSS compare with the desired accuracy. For example for TSS1 the inspection objects for the first 10 pieces are used to provide an average value for each residual. Assuming the desired Cpk is 2.0 for each residual, then the average accuracy must be twice as good as the desired accuracy to meet this quality standard. If the results do not meet the quality standard then the designer may change the accuracy standard per accuracy optimization CAS/CAD application element 1414.

Using the original accuracy specifications per CAS/CAD application element 1412, or the optimized accuracy specifications per CAS/CAD application element 1414, the machinist continues per CAS/CAM application element 1416 to manufacture the next 10 pieces.

Results for inspections of objects and validations are sent to CAS/CAD application element 1418 where the designer determines if the Cpk quality standards are being met. If the results do not meet the quality standard then the designer may change the accuracy specifications per accuracy optimization CAS/CAD application element 1222.

Using the original accuracy specifications per CAS/CAD application element 1412, or the optimized accuracy specifications per CAS/CAD application element 1420, the machinist continues per CAS/CAM application element 1422 to manufacture the next 10 pieces.

Similar to CAS/CAD application elements 1412 and 1418 the designer may choose to modify the accuracy or Cpk specifications per CAS/CAD application element 1424. However if the designer does not approve the results at this point, then the designer may choose to abort manufacture.

The machinist may then use the CNC mill for another customer.

If the designer approves the quality standard results for Cpk per CAS/CAD application element 1424, then the machinist may proceed to complete the manufacture of for instance the 100 piece job. The control of manufacture to completion may now be controlled by Cassie to alert the machinist if anything is out of specification.

Both the designer and the machinist realize that time is of the essence for the use of the CNC mill. The designer may have a DFM guideline per CAS/CAM application element 1320 in FIG. 13, giving the designer a window in time to respond with the decisions to continue or abort the manufacture per CAS/CAD application elements 1412, 1418, and 1424.

Because time is of the essence the transfer of data between the CAS/CAM application and CAS/CAM application elements must be handled efficiently. One way to insure this is to use enterprise cloud based applications for the CAS/CAM application and the CAS/CAD application. Such enterprise cloud based applications are supported by IBM®, Oracle®, HP Enterprise®, and Google®.

Figure 15:
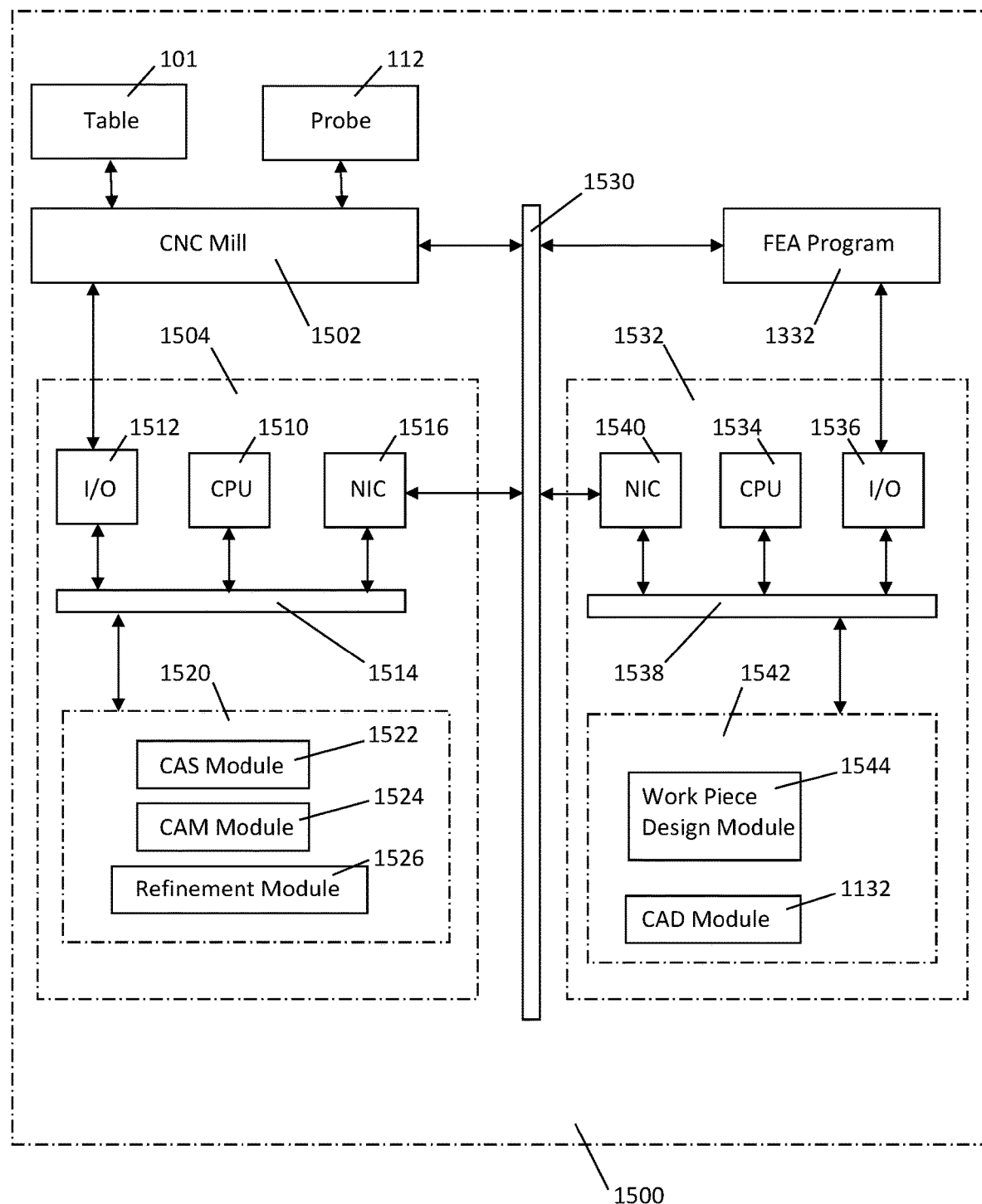
FIG. 15 illustrates a system configured in accordance with an embodiment of the invention.

FIG. 15 illustrates a system 1500 configured in accordance with an embodiment of the invention. The system 1500 includes the previously discussed table 101 and probe 112, which are used in conjunction with a CNC mill 1502. For example, the CNC mill 1502 may control the movement of the table 101 and/or the probe 112.

Associated with the CNC mill 1502 is a computer 1504. The computer 1504 includes a processor or central processing unit 1510 connected to input/output devices 1512 via a bus 1514. The input/output devices 1512 may include a keyboard, mouse, touch display and ports (e.g., an RS-232 cable port) for connection with the CNC mill 1502. Also connected to the bus 1514 is a network interface circuit 1516, which provides connectivity to network 1530, which may be any combination of wired and wireless networks. The input/output devices 1512, bus 1514 and network interface circuit 1516 are each an example of a communication interface. As used herein, a communication interface refers to an electronic circuit designed to a specific standard to facilitate communication between devices. The devices may be a probe, a computer numeric control mill, a computer, a computer module stored in memory, a wired network and/or a wireless network. The CNC mill 1502 may be controlled via input/output ports 1512 and/or over network 1530.

Also connected to the bus 1514 is a memory 1520. The memory 1520 stores instructions executed by the processor 1510 to implement operations disclosed herein. In one embodiment, the memory 1520 stores a CAS module 1522 to implement the disclosed CAS operations. The memory 1520 may also store a CAM module 1524 to implement the disclosed CAM operations. Finally, the memory 1520 may store a refinement module 1526 to implement the computation of the different refinements discussed herein.

The network 1530 may be connected to a server 1532. By way of example, the server 1532 may be a cloud resource of the type discussed above. The server 1532 includes a central processing unit 1534, input/output devices 1536, a bus 1538 and a network interface circuit 1540. A memory 1542 is connected to the bus 1538. The memory stores a work piece design module 1544 with instructions executed by the processor 1534 to implement work piece design operations disclosed herein. The memory 1542 may also store a CAD module 1132 to implement the disclosed CAD operations.

The configuration of system 1500 is exemplary. It should be appreciated that the work piece design module 1544 and the CAD module 1132 may be executed on machine 1504. Similarly, the CAS module 1522, CAM module 1524 and refinement module 1526 may be implemented on machine 1532. It is the disclosed operations that are significant, not where those operations are performed.

The operations of FIG. 10 are more fully appreciated with reference to FIG. 15. The probe 112 is used to collect a first set of probe signals from a three dimensional axis gauge characterizing axis directions of a table. This corresponds to block 1030 of FIG. 10. Axes directions for the table relative to a vise on the table are computed from the first set of probe signals. This computation may be performed by the refinement module 1526. The probe 112 is used to collect a second set of probe signals from electronic gauge blocks that characterize the position of the table. This corresponds to operation 1040 of FIG. 10. Actual table positions are then computed from the second set of probe signals. This computation is performed by the refinement module 1526, which also computes table position residual between the actual table positions and desired table positions. The table position residuals may then be sent to the CNC mill 1502 via a communication interface, such as input/output devices 1512 or via network 1530.

The CAM module 1524 may be used to implement the operations discussed in connection with FIGS. 7A-9. For example, the CAM module 1524 may include instructions executed by processor 1510 to compute a first desired path for the table relative to a cutting tool using static offsets for the cutting tool (e.g., CNC mill 1502). The first desired path for the table relative to the cutting tool is conveyed to the cutting tool. The probe 112 is used to collect work piece probe signals characterizing a machined work piece feature formed by the cutting tool using the first desired path for the table. The refinement module 1526 or the CAM module 1524 compute a work piece residual between the work piece probe signals and the first desired path for the table relative to the cutting tool. The work piece residual represents a dynamic offset of the cutting tool. The work piece residual is conveyed to the cutting tool via input/output device 1512 or via network 1530.

The operations of FIG. 11 are more fully appreciated with reference to FIG. 15. The work piece design module 1544 may be used to perform the operations shown in block 1100 of FIG. 11. In particular, a designer may use the work piece design module 1544 to create drawing objects characterizing a work pieced to be machined. The drawing objects are then sent to machine 1504 via network 1530. The machine 1532 receives from the network 1530 time sequenced steps corresponding to the drawing objects. The time sequenced steps were generated by machine 1504 or another machine. Time sequenced work piece inspection operations are then derived by the work piece design module 1544. The time sequenced work piece inspection operations are then sent to the machine 1504 or directly to the CNC mill 1502 via network 1530.

Machine 1504 may work with machine 1532 in the following manner. Machine 1504 may receive drawing objects generated by the work piece design module 1544. The refinement module 1526 may then be used to define time sequenced steps corresponding to the drawing objects. The time sequenced steps are then returned to the machine 1532 via network 1530. Machine 1504 then receives from the work piece design module 1544 time sequenced work piece inspection operations. Machine tool inspection operations are then coordinated based upon the time sequenced work piece inspection operations.

The operations of FIG. 13 are more fully appreciated in the context of the system 1500 of FIG. 15. The work piece design module 1544 may be used to compute a first time sequence of work piece fabrication steps and inspection steps. The machine 1532 may then access machine 1504 or another machine connected to network 1530 to collect first fabrication costs and inspection costs associated with the first time sequence of work piece fabrication steps and inspection steps performed by a cutting tool (e.g., CNC mill 1502) and probe 112. The work piece design module 1544 includes instructions executed by the processor 1534 to estimate first gross fabrication costs associated with the first time sequence of work piece fabrication steps and inspection steps based upon the first fabrication costs and inspection costs. The work piece design module 1544 derives a second sequence of work piece fabrication steps and inspection steps with a second fabrication cost lower than the first fabrication cost. The second sequence of work piece fabrication steps may be tested using a finite element analysis (FEA) machine 1332 (e.g., a machine, such as 1504 and 1532 of FIG. 15). The FEA machine may interface either to network 1530 or to the I/O 1536 of server 1532. The second sequence of work piece fabrication steps and inspection steps are conveyed to machine 1504 and/or CNC Mill 1502 via network 1530.

The operations of FIG. 14 are more fully appreciated in the context of the system 1500 of FIG. 15. The work piece design module 1544 may receive inspection results from machine 1504. The work piece design module 1544 includes instructions executed by processor 1534 to derive a new accuracy inspection protocol based upon the inspection results. The new accuracy inspection protocol may be conveyed to machine 1504 and/or CNC mill 1502 via network 1530. Similarly, the work piece design module 1544 may receive quality metric data from machine 1504. The work piece design module 1544 includes instructions executed by processor 1534 to derive a new quality metric protocol based upon the quality metric data. The new quality metric protocol is conveyed to machine 1504 and/or CNC Mill 1502 via network 1530.

As previously mentioned, the table 101 and/or machine 1504 may have a microphone and speaker to facilitate the oral communication of instructions associated with embodiments of the invention. For example, a microphone may collect voice data (e.g., from an operator of CNC mill 1502). The CAM module 1524 may include instructions executed by processor 1510 to process the voice data with a voice recognition application to produce audible instructions. The audible instructions may then be conveyed to a speaker to coordinate operations disclosed herein.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-volatile computer readable storage medium with instructions executed by a processor to:
   collect from a communication interface, a first set of probe signals from a three dimensional axis gauge characterizing axis directions of a table,
   compute axes directions for the table relative to a vise on the table from the first set of probe signals, collect from the communication interface, a second set of probe signals from electronic gauge blocks that characterize position of the table, compute actual table positions from the second set of probe signals, compute table position residuals between the actual table positions and desired table positions, and convey the table position residuals to the communication interface.

2. The non-volatile computer readable storage medium of claim 1 further comprising instructions executed by the processor to:

compute a first desired path for the table relative to a cutting tool using static offsets for the cutting tool, convey the first desired path for the table relative to the cutting tool to the communication interface, collect from the communication interface work piece probe signals characterizing a machined work piece feature formed by the cutting tool using the first desired path for the table, compute a work piece residual between the work piece probe signals and the first desired path for the table relative to the cutting tool, wherein the work piece residual represents a dynamic offset of the cutting tool, and convey the work piece residual to the communication interface.

3. The non-volatile computer readable storage medium of claim 1 further comprising instructions executed by the processor to:

create drawing objects, convey the drawing objects to the communication interface, receive from the communication interface time sequenced steps corresponding to the drawing objects, create time sequenced work piece inspection operations, and send the time sequenced work piece inspection operations to the communication interface.

4. The non-volatile computer readable storage medium of claim 1 further comprising instructions executed by the processor to:

receive drawing objects from the communication interface, define time sequenced steps corresponding to the drawing objects, send the time sequenced steps to the communication interface, receive from the communication interface time sequenced work piece inspection operations, and coordinate machine tool inspection operations based upon the time sequenced work piece inspection operations.

5. The non-volatile computer readable storage medium of claim 1 further comprising instructions executed by the processor to:

compute a first time sequence of work piece fabrication steps and inspection steps, collect from the communication interface first fabrication costs and inspection costs associated with the first time sequence of work piece fabrication steps and inspection steps performed by a cutting tool and a probing tool, estimate a first gross fabrication cost associated with the first time sequence of work piece fabrication steps and inspection steps based upon the first fabrication costs and inspections costs, derive a second sequence of work piece fabrication steps and inspection steps with a second fabrication cost lower than the first fabrication cost, and convey the second sequence of work piece fabrication steps and inspection steps to the communication interface.

6. The non-volatile computer readable storage medium of claim 1 further comprising instructions executed by the processor to:

receive from the communication interface inspection results, derive a new accuracy inspection protocol based upon the inspection results, and convey the new accuracy inspection protocol to the communication interface.

7. The non-volatile computer readable storage medium of claim 1 further comprising instructions executed by the processor to:

receive from the communication interface quality metric data, derive a new quality metric protocol based upon the quality metric data, and convey the new quality metric protocol to the communication interface.

8. The non-volatile computer readable storage medium of claim 1 further comprising instructions executed by the processor to:

collect from a microphone on the table voice data, process the voice data with a voice recognition application to produce audible instructions, and convey the audible instructions to a speaker on the table.

* * * * *